R. J. STUART.
VEGETABLE GATHERER AND LOADER.
APPLICATION FILED NOV. 22, 1916.
1,256,390.
Patented Feb. 12, 1918.
2 SHEETS—SHEET 1.
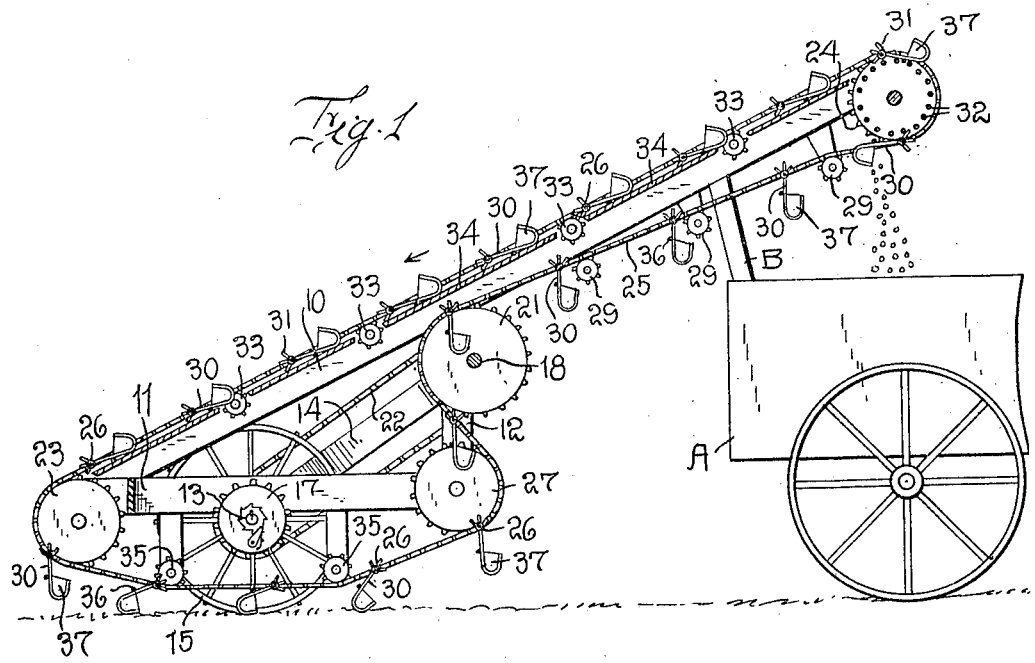
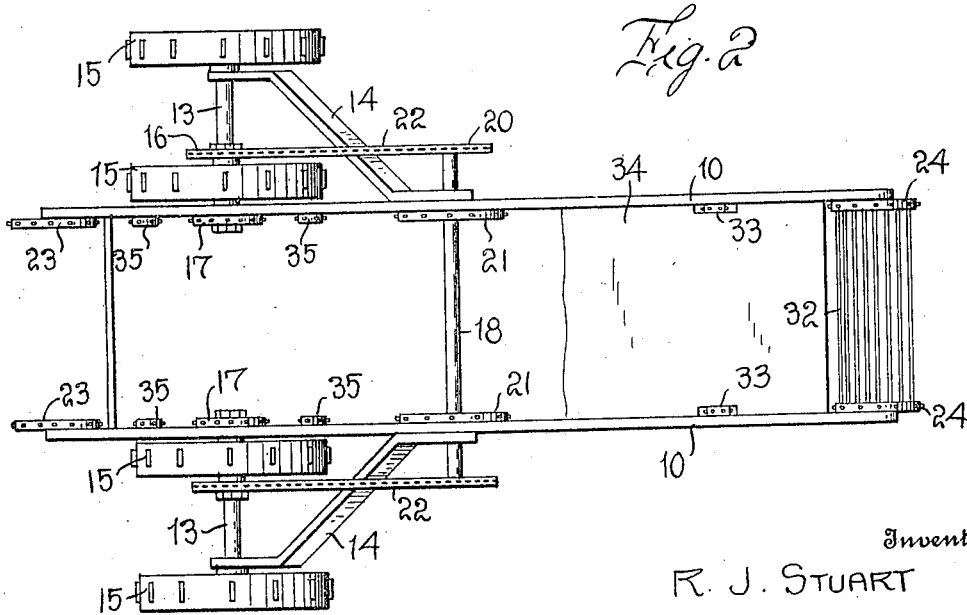
Inventor
R. J. STUART
By Watson E. Coleman
Attorney R. J. STUART.
VEGETABLE GATHERER AND LOADER.
APPLICATION FILED NOV. 22, 1916.
1,256,390.
Patented Feb. 12, 1918.
2 SHEETS—SHEET 2.
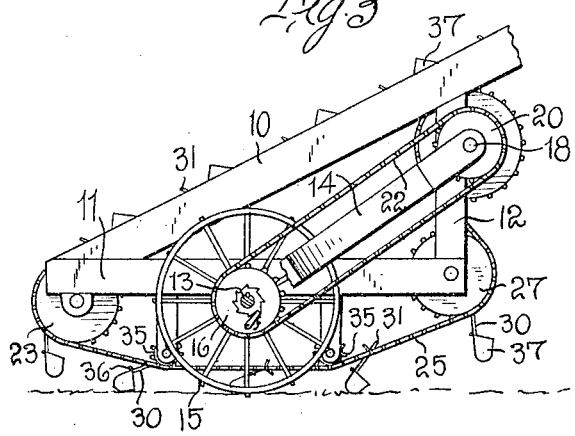
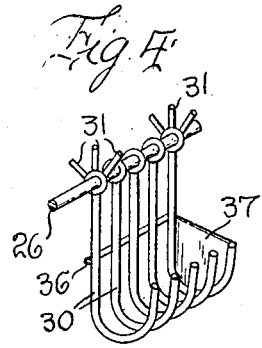
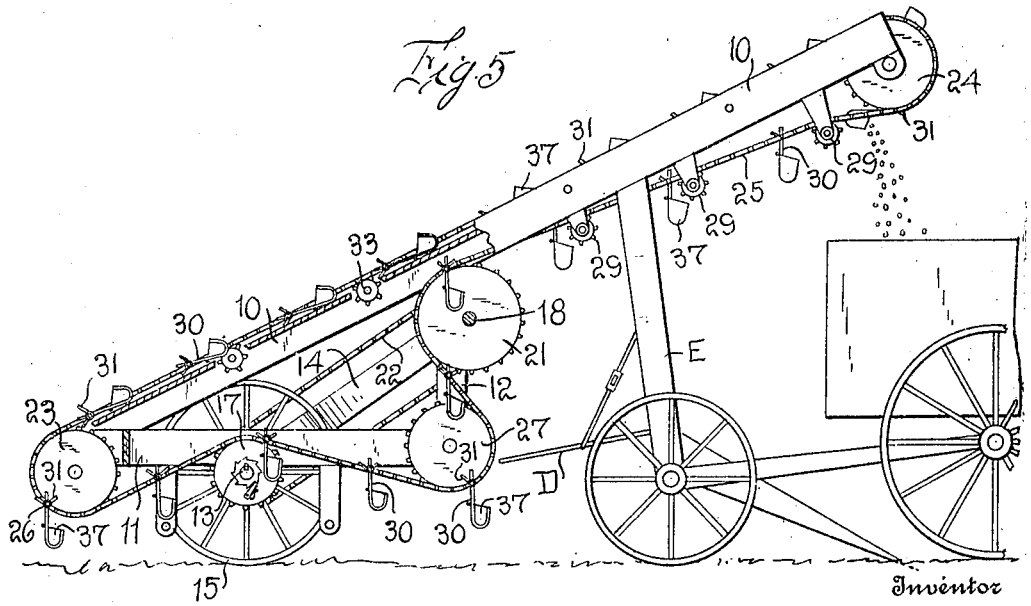
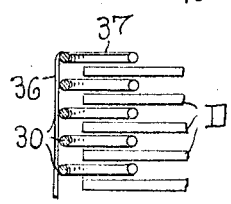
Inventor
R. J. STUART
By Watson E. Coleman
Attorney

UNITED STATES PATENT OFFICE.

ROBERT JOHN STUART, OF DETROIT, MICHIGAN.

VEGETABLE GATHERER AND LOADER.

1,256,390.  Specification of Letters Patent.  Patented Feb. 12, 1918.

Application filed November 22, 1916. Serial No. 132,864.

*To all whom it may concern:*

Be it known that I, ROBERT J. STUART, a citizen of the United States, residing at Detroit, in the county of Wayne and State of Michigan, have invented certain new and useful Improvements in Vegetable Gatherers and Loaders, of which the following is a specification, reference being had to the accompanying drawings.

This invention relates to harvesting machinery and particularly to means for gathering potatoes either when they are lying on the ground or when they have been lifted by a digging means and the general object of the invention is to provide a very simple, easily operated construction so designed that it may be used under the two circumstances above noted and further so designed that potatoes or other vegetables which may be gathered by the mechanism will be carried upward and deposited in a wagon.

A further object of the invention is to provide a device of this character including an endless element from which are supported a plurality of swinging fingers and provide means whereby these fingers may be drawn along the ground to gather up potatoes lying thereon and whereby the fingers will be turned to a carrying position as they pass between the ground and the position where they are to discharge potatoes and provide means whereby these carrying fingers or gathering fingers may be rotated to discharge the collected potatoes into the wagon.

A further object is to provide a device for carrying potatoes up to and discharging them into a wagon which may be used either with or without a potato digger mechanism.

Other objects will appear in the course of the following description.

My invention is illustrated in the accompanying drawings, wherein—

Figure 1 is a longitudinal sectional view of a gatherer and loader constructed in accordance with my invention;

Fig. 2 is a top plan view of the construction shown in Fig. 1;

Fig. 3 is a fragmentary side elevation of the lower part of the construction shown in Figs. 1 and 2, the brace 14 being partly broken away;

Fig. 4 is a fragmentary perspective view of the gathering fingers; and

Fig. 5 is a vertical sectional view as in Fig. 1 but showing the gatherer and loader as used in connection with a digger.

Fig. 6 is a fragmentary plan view of a portion of the fingers D and the fingers 30, these fingers being shown in section.

Referring to these drawings it will be seen that my improved mechanism comprises a frame comprising oppositely disposed parallel supporting beams 10 which are upwardly inclined at their forward ends, said beams being operatively connected to each other and braced from each other. The lower ends of the beams are mounted upon a frame including the side beams 11 and the vertically disposed braces 12.

The beams 11 are operatively supported each upon a laterally projecting axle 13 as by braces 14, each axle carrying upon it a pair of traction wheels 15 which may be formed so as to secure good engagement with the ground. Each of these axles 13 carries upon it a sprocket wheel 16 disposed outward of the inner traction wheel 15 and the inner end of each axle carries upon it a sprocket wheel 17. Mounted upon the braces 12 or in any other suitable manner is a transverse shaft 18 which carries at its ends the sprocket wheels 20 and which has mounted upon it inward of the beams 10 the sprocket wheels 21. Sprocket chains 22 pass from the sprocket wheels 16 over the sprocket wheels 20 and provide for driving the shaft 18 from the traction wheels. Means are provided as will be hereafter stated for preventing a reverse movement of the traction wheels from operating the shaft 18. Mounted upon the rear end of the frame and specifically upon the beams 11 are the oppositely disposed sprocket wheels 23 and operatively supported upon the upper ends of the beams 10 and shown as supported below these beams are the sprocket wheels 24. Passing over the sprocket wheels 23 and 24 are the sprocket chains 25 having a plurality of transversely extending rods 26 for the purpose of pivotally supporting the gathering fingers, as will be later stated.

Mounted upon the lower ends of the braces 12 or in any other suitable position are the sprocket wheels 27 and mounted above these sprocket wheels 27 are the sprocket wheels 21. Under certain circumstances, as in Fig. 1, the sprocket chains 25 pass directly from the sprocket wheels 24 downward to the sprocket wheels 23 and then pass beneath and out of engagement with the sprocket wheels 17 and pass to and under the sprocket wheels 27, then up and over the rear faces of the sprocket wheels 21 and then to the sprocket wheels 24. The lower flight of the sprocket chain 25 between the wheels 21 and 24 may be supported by idler sprocket wheels 29. Under certain other circumstances, however, as in Fig. 5, the lower flight of the sprocket chains 25 passes over the sprocket wheels 17 and then down beneath the sprocket wheels 27, the sprocket wheels 17 being so disposed as to be on a higher level than the sprocket wheels 27 so that the endless carrier will pass upward from the sprocket wheels 23, over the sprocket wheels 17 and then downward under the sprocket wheels 27.

Swingingly mounted upon each of the rods 26 are a plurality of hook shaped carriers or gathering fingers, as illustrated in Fig. 4, these fingers being designated 30. These fingers may either be pivotally supported upon the rods 26 or the rods may be rotatably or pivotally supported on the sprocket chains. These fingers 30 are disposed at a distance of about an inch and a half from each other more or less and certain of the fingers 30 are provided with three divergent or radiating pins or extensions 31 at their upper ends, immediately above the point of connection with the rod 26. The sprocket wheels 24 are connected by means of transversely extending rods 32 which are disposed at spaced intervals around the margin of the sprocket wheels so as to form what is practically an elongated lantern wheel or drum and these rods are adapted to engage with the pins 31 to turn the potato carriers or fingers into a dumping position, as illustrated at the right hand end of Figs. 1 and 5.

Preferably the traction wheels are so connected to the axles 13 that a reverse movement of the traction wheels will not rotate the axles. This may be readily accomplished by the ordinary pawl and ratchet construction applied to these wheels. This is a common construction and, therefore, needs no special description. This construction is necessary in order to prevent the reverse operation of the carrier when the machine is being backed, as is required where the machine is turning.

In the operation of this invention as a potato gatherer alone, where the potatoes have been already dug and are disposed on the surface of the ground, the sprocket chains 25 do not extend over the sprocket wheels 17 but depend loosely below these sprocket wheels. The forward end of the frame formed by the members 10 is engaged with a wagon A in any suitable manner so as to be drawn along with the wagon and is braced in this position, as for instance by means of a brace B. Now as the machine is drawn along the ground the traction wheels through their connections will transmit power to the driving sprocket wheels on the shaft 18 and this power will be transmitted to the sprocket chains. The carrier formed by the sprocket chains 25 with the transverse rods 26 and the fingers 30 will move in the direction of the arrow in Fig. 1 and as the fingers 30 pass around the axis of the sprocket wheels 23, the fingers will drop down or swing down to the position shown in Fig. 1 and then as the lower flight of the sprocket chains pass from the sprocket wheels 23 to the sprocket wheels 27, these hook shaped fingers will be drawn along the ground and will rake up the potatoes and gather them within the hook shaped and gather them near the sprocket fingers. As the fingers 30 near the sprocket wheels 27 they will commence to turn forward until as the sprocket chains pass over the sprocket wheels 27 the fingers will be carried into a vertical position so that the hook shaped portions thereof will support the potatoes which have been gathered up. As the sprocket chains 12 pass over the sprocket wheels 21 and thence move upward toward the sprocket wheel 24, the carriers or fingers will still be maintained in a depending vertical position so that the potatoes will not drop out. When a finger or series of fingers 30 reaches the lantern wheel formed by the rods 32, these rods acting as gear teeth will engage the pins 31 which will also act as gear teeth and the fingers of that series will be rotated from a depending position to a horizontal position, thus discharging the potatoes or other vegetables into the wagon A. As the fingers pass around the rods 32 and get to the upper flight of the carrier, the fingers will drop back and rest upon a web 34 immediately below the fingers and the fingers will be carried down this upper flight to the position shown in Fig. 1. In Fig. 5 I show my invention as applied where a potato digger is used. I do not wish to limit myself to any particular form of potato digger as my invention does not lie in the potato digger *per se*. I have illustrated, however, a potato digger having forwardly extending plows or digging blades mounted upon a supporting truck having wheels and provided with means whereby the potatoes may be lifted after they are dug and carried upward and discharged on a series of downwardly and rearwardly inclined rods D. These rods are disposed in staggered relation to the fingers or carriers 30 so that the carriers may pass between the rods in their upward movement. In this case the sprocket chains are passed over the sprocket wheels 17 so as not to drag along the ground and as the sprocket chains pass over the sprocket wheels 27 the fingers will move upward between the rear ends of the bars D, thus gathering the potatoes from the bars, carrying them upward and discharging them into the wagon box A in the manner heretofore described. In this case the frame of the potato gatherer should be operatively supported upon the potato digger as for instance by means of the braces E.

For the purpose of supporting the upper flight of the endless carrier so that it will not sag I may mount upon the beams 10 the idle sprocket wheels 33 and in order to support the gathering members in the position illustrated I may dispose a web 34 of sheet metal or other suitable material just below the path of travel of the gathering members over which the transverse rod supporting the gathering members will travel. In order that the rear portion of the carrier may be positively held parallel to the ground I may provide the sprocket wheels 35 disposed on either side of the sprocket wheels 17 and preventing any upward movement of the carrier, these sprocket wheels 35 being removed if desired when the machine is arranged as illustrated in Fig. 5.

Preferably the hook-shaped gathering fingers 30 are rigidly connected to each other as by means of cross bars 36 so that the fingers cannot part and allow the potatoes or other vegetables to pass downward between the fingers. The end fingers of each row of fingers will be provided with the lateral shields 37 which will prevent the vegetables from dropping off at the ends of the rows of fingers. It will be obvious that each row of connected gathering fingers constitutes a scoop which is hook-shaped in cross section and that the only reason for making the fingers separate from each other is to provide slots to permit the fingers to pass the bars D of the potato digger and also to permit earth and trash to sift through the connected fingers so that the potatoes will be discharged into the wagon in a relatively clean condition.

While I have illustrated the endless carrier as being driven by power taken from traction wheels of the machine, it is to be understood that I do not wish to be limited to this as it is obvious that the carrier might be driven by a motor of any suitable character such as an internal combustion engine or an electric motor run by storage batteries.

While I have before referred to this machine as being particularly adapted for gathering potatoes, I wish it understood that it may be used for gathering other vegetables and that the principle of the invention may be embodied in other forms of gathering machines.

Having described my invention, what I claim is:

1. A machine of the character described including an endless carrier comprising laterally disposed endless elements, transverse rods mounted on the elements, and a plurality of hook-shaped gathering fingers mounted upon each rod to swing, the elements being connected to each other for common swinging movement and each series of gathering fingers having end shields, and means disposed at one point in the flight of said endless carrier engaging successively each series of gathering fingers and rotating them to a dumping position.

2. In a machine of the character described, a supporting frame, an endless carrier mounted upon the frame, a plurality of depending gathering members mounted on the carrier and swingingly mounted thereon and freely depending from the lower flight of the carrier, said gathering members having extensions projecting above the inner surface of the lower flight of the carrier, and means for rotating said gathering members from a depending to a discharging position comprising a drum over which the endless carrier passes having transversely extending spaced members adapted to engage with said extensions of the gathering members and rotate the gathering members rearward and upward to a discharging position.

In testimony whereof I hereunto affix my signature in the presence of two witnesses.

ROBERT JOHN STUART.

Witnesses:
DORITHA A. GAGER,
CHAS. H. GAGER.

Copies of this patent may be obtained for five cents each, by addressing the "Commissioner of Patents, Washington, D. C."